United States Patent [19]

Timms

[11] Patent Number: 4,519,561
[45] Date of Patent: May 28, 1985

[54] AIRCRAFT THRUST REVERSER MECHANISM

[75] Inventor: Richard H. Timms, San Diego County, Calif.

[73] Assignee: Rohr Industries, Inc., Chula Vista, Calif.

[21] Appl. No.: 497,249

[22] Filed: May 23, 1983

[51] Int. Cl.³ .............................................. F02K 1/00
[52] U.S. Cl. ................................ 244/110 B; 60/230; 239/265.33
[58] Field of Search ........... 244/110 B, 110 R, 110 D; 239/265.19, 265.23, 265.33; 60/226.1, 226.2, 229, 230; 74/424.8 B, 89.15

[56] References Cited

U.S. PATENT DOCUMENTS

| | | | |
|---|---|---|---|
| 2,972,860 | 2/1961 | Moy | 60/230 |
| 3,013,386 | 12/1961 | Meyer | 239/265.19 |
| 3,024,605 | 3/1962 | Nash | 239/265.19 |
| 3,592,070 | 7/1971 | Hammond | 74/89.15 |
| 3,612,399 | 10/1971 | Rodgers et al. | 239/265.19 |
| 4,041,795 | 8/1977 | Rekoff, Jr. | 74/424.8 B |

Primary Examiner—Trygve M. Blix
Assistant Examiner—Rodney Corl
Attorney, Agent, or Firm—Patrick J. Schlesinger; Frank D. Gilliam

[57] ABSTRACT

Thrust reverser actuation mechanisms comprising a pair of nested screwjacks commonly driven by a screwjack drive motor. The inner screwjack translates the blocker doors aft and the outer screwjack deploys the blocker doors into the engine jet stream. The screwjacks have different thread pitches so that the blocker doors are translated aft at a faster rate of speed than they are deployed into the engine jet stream.

7 Claims, 4 Drawing Figures

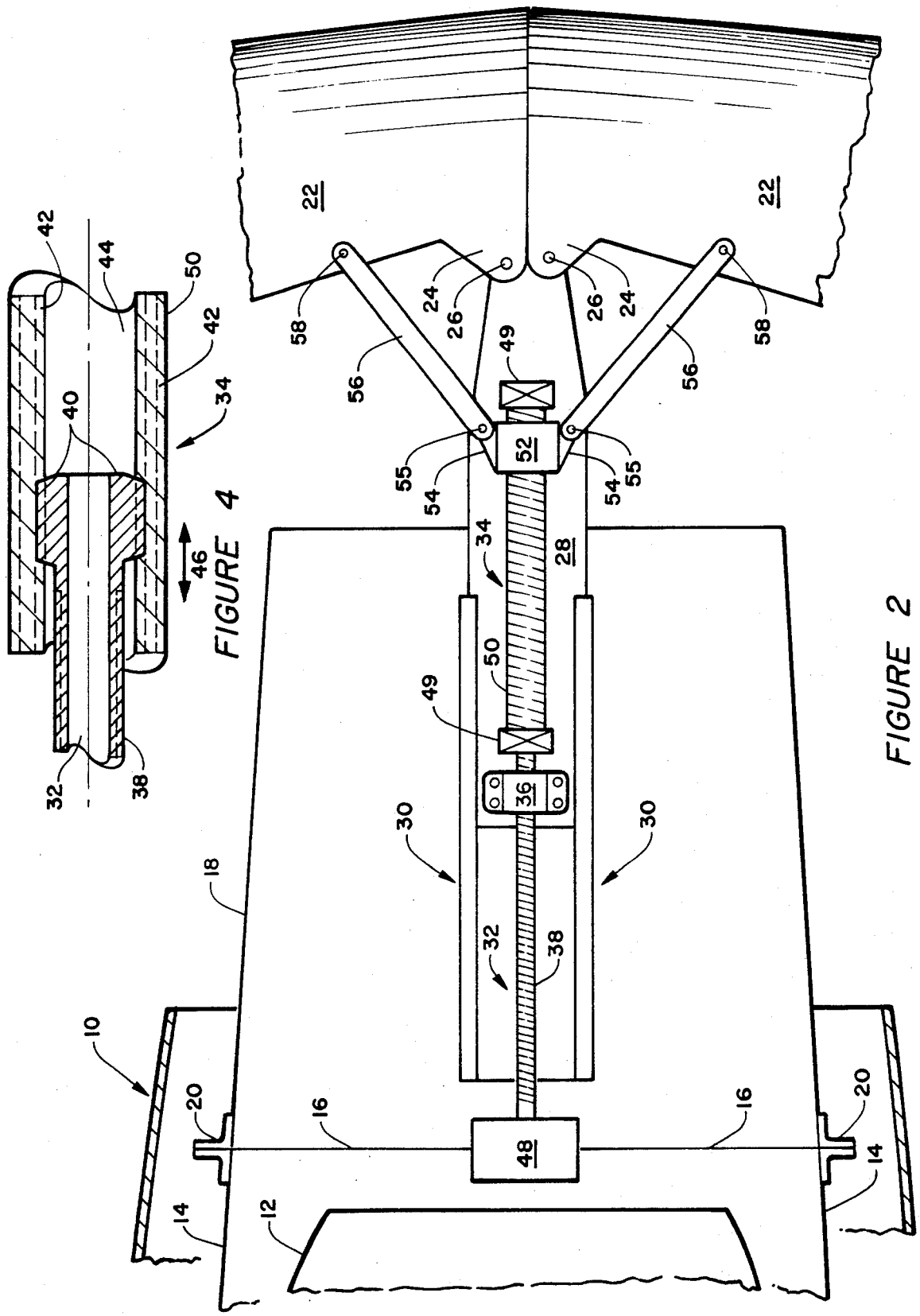

AIRCRAFT THRUST REVERSER MECHANISM

BACKGROUND OF THE INVENTION

The invention relates generally to a thrust reverser for gas turbine fan-jet propulsion engines utilized in modern aircraft and more particularly to deploying mechanism therefor.

Various different types of fan gas reversers presently exist, most of which are considered to be useful for their intended purpose. Some of the prior art reversers utilize cowl section translation with simultaneous deployment of reverse or blocker donors, as well as providing an opening in the cowl surrounding a turbofan engine with a translatable cascade ring being positioned thereon to provide an exit and direct the gases forwardly through.

Actuation mechanism generally consist of link and liner actuator combinations for both cowl section translation and reverser or blocker door deployment.

A novel two-part reverser or blocker door is taught by U.S. Pat. Nos. 3,964,257 and 4,073,440, wherein the abutting ends of the reverser or blocker doors form curved single rack gears with interlocking and meshing teeth so that both reverser or blocker doors operate simultaneously between their stowed and deployed positions.

A clam shell type thrust reversing mechanism having curved single rack gear abutting ends on each clam shell reverser or blocker door for simultaneous movement between their stowed and deployed positions is taught in U.S. Pat. No. 3,759,467.

U.S. Pat. No. 3,612,399 teaches the simultaneous deployment of reverser or blocker doors while translating the door aft by use of a single screwjack with separate threaded portions of different thread pitch. The mechanism provides for rearward translation of the reverser or blocker doors at a faster rate than the door deployment to a full blocking position.

British Pat. No. 778,008 teaches the use of separate actuators, one to first translate the reverser or blocker doors aft and one associated with each reverser or blocker door for their simultaneous deployment after translation.

U.S. Pat. No. 2,972,860 teaches two reverser or blocker doors of the clam shell variety pivotally connected to each other in their down stream end portions for rotation in opposite directions about an axis normal to the axis of the engine and are jointly controlled by a first actuator for translating the doors aft and a second actuator for rotating the doors into the path of the engine gas stream.

As aforementioned, most of the existing thrust reversing mechanisms have various merits and in most instances have been used with some degree of success. The principal objections have included requirements for excessive operating mechanisms to insure uniform and sometimes simultaneous translation and deployment of reverser or blocker doors that result in excess-weight, which is critical in modern aircraft, higher economic costs and over-all complexity with the resulting high maintenance both in aircraft down time and economic cost, and very little, if any, consideration in design was directed toward maintaining excess area size balance during the translation and deployment of the reverser or blocker doors to prevent possible loading or stalling of the engine through back pressure.

SUMMARY OF THE INVENTION

The present invention obtains the benefit of the aforementioned reverser or blocker door mechanisms and, in addition, provides a mechanism that has a positive interaction between reverser or blocker door translation and deployment; weight has been reduced by a reduction of active elements employed, which further reduces the required aircraft maintenance costs and down time; the operation of the mechanism between the reverser or blocker door stowed and deployed positions provides and maintains engine pressure balance during movement; and no cowl duct or its translation is required.

Generally stated, in the presently preferred form the mechanism includes a first central screwjack driven by a drive motor attached to the aircraft fixed structure. The first screwjack is operatively coupled to a translating support which translates either aft or forward, depending on the rotational direction of the first screwjack to either deploy or stow the reverser doors. The translating support carries the reverser or blocker doors therewith. A second screwjack is slidably mechanically connected to the first screwjack and rotates therewith. The second screwjack is connected through a translatable carriage and drive links to each reverser or blocker door. The slidable connection between the first and second screwjacks allows the second screwjack to translate relative to the first screwjack when rotated. The thread pitches of the two screwjacks are different. The second screwjack has threads of a different pitch than those of the first screwjack. The thread pitch difference causes the reverser or blocker doors to translate aft at a speed at greater than the speed which they are rotated into or out of the engine gas steam thereby ensuring that the engine is not back pressured or overheated as the thrust reverser is deployed.

Various other advantages and features of novelty will become apparent to those skilled in the art as the description proceeds in conjunction with the accompanying drawings in which:

BRIEF DESCRIPTION OF THE DRAWINGS

FIG. 2 is a diagrammatic side elevated section of the rear portion of an aircraft engine illustrating the reversing mechanism in a deployed position;

FIG. 4 is a partial cutaway enlarged showing of the connection between the inner and outer screwjacks of the actuator.

DETAILED DESCRIPTION OF THE PREFERRED EMBODIMENT

Figure 1:
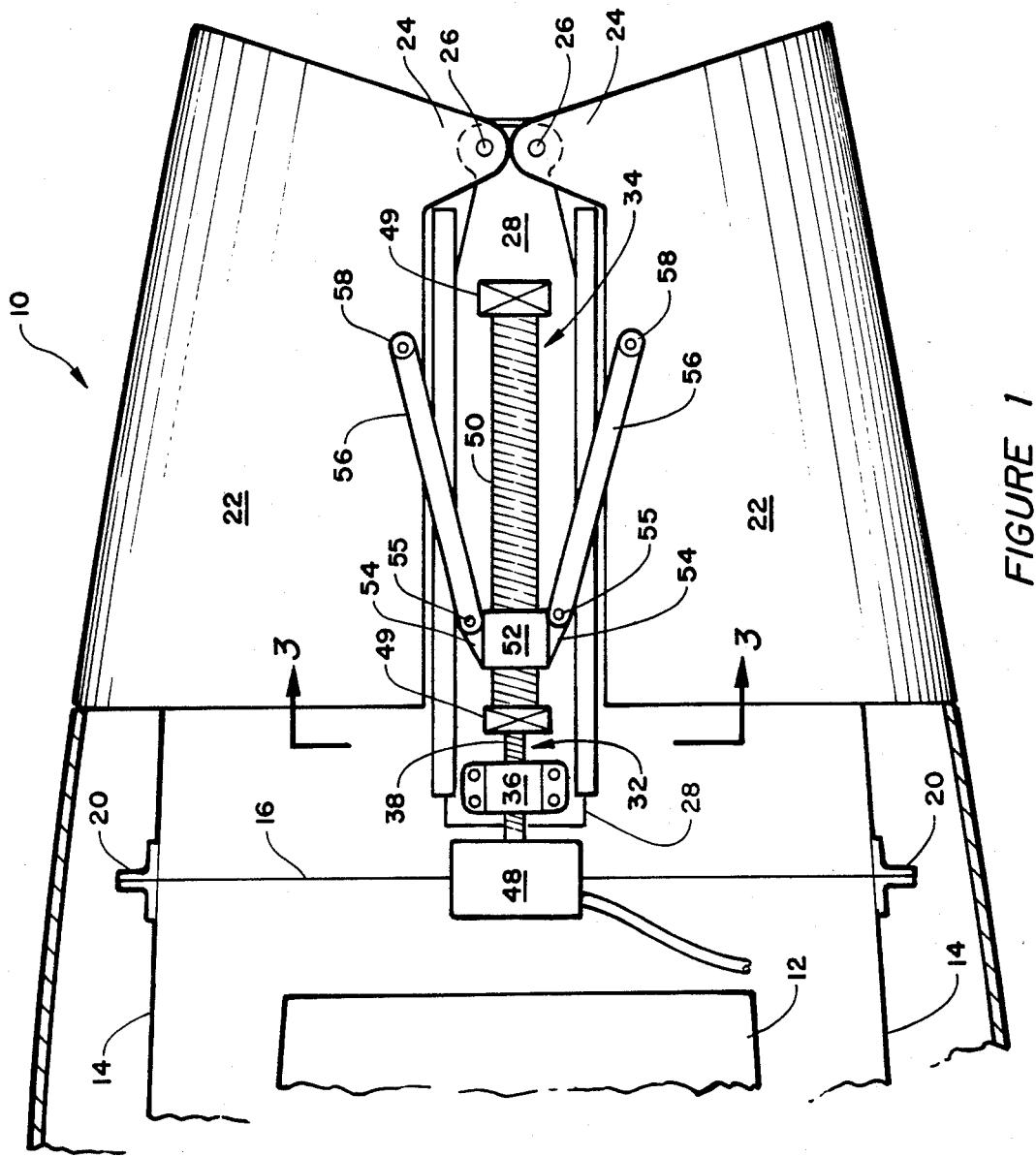
FIG. 1 is a diagrammatic side elevated section of the rear portion of an aircraft engine depicting the reversing mechanism in a stowed position.

Referring to the Figures of the drawings in detail and in particular to FIGS. 1 and 2, there is shown the aft end of the nacelle 10 of an aircraft engine (not shown) having a core stream exhaust nozzle structure 12 incorporated therein in accordance with the present invention. The particular engine forms no part of the invention and may be of any suitable type. However, as well understood in the art, the nacelle 10 is provided with a fan stream duct 14 and also contains the various components of the engine through which gases formed by fuel combustion are utilized to provide a jet propulsion effect as the gases pass rearward through the nozzle 12 and the fan stream from nozzle 14.

Attached to the rear surface 16 of the duct 14 is an extension nozzle 18, as seen in FIG. 2. This attachment may be of any convenient means known in this art, an example being bolt and nut communications engaging apertures through flange 20 positioned around the periphery of the end 16.

Figure 3:
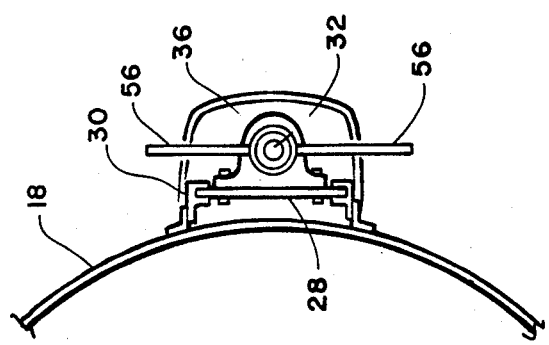
FIG. 3 is a showing taken along line 3—3 of FIG. 1.

The reverser mechanism includes a pair of semicircular longitudinally extending reverser or blocker doors 22 attached at their inner aft corner surfaces 24 through pivotal connections 26 to a translating support member 28. The doors 22 are faired into the rear portion of the nacelle 10 and preferably terminate slightly beyond the exit plane of extension 18. The translating support member 28 is carried by the nozzle extension 18 through suitable track means 30 (see FIG. 3) suitably connected to extension 18 and which allows the support member freedom of forward and aft translation relative to the nozzle extension 18.

Inner and outer nested screwjacks 32 and 34 respectively are utilized to translate the support surface 28 and simultaneously position the target reverser or blocker doors 22 in a turbo fan stream blocking position. (see FIG. 4 for details) A suitable nut means 36 is fixedly attached to the translating support 28. The threads 38 of screwjack 32 engage the threads of nut 36.

Referring now to FIG. 4, the end of screwjack 32 includes splines 40 that mate with keyways 42 on the inner surface of screwjack 34. As can readily be understood, the spline/keyway engagement causes the two screwjacks to rotate together and because the spline/keyway combination extends coaxially with the longitudinal center line of the screwjacks, the screwjack 34 can translate along the direction of arrows 46 relative to screwjack 32. While a particular spline/keyway arrangement is illustrated, the invention is not limited to the particular embodiment shown and any mechanical connection which would permit a slidable mechanical connection between the screwjacks 32 and 34 would be within the scope of the invention.

Referring again to FIGS. 1 and 2, the screwjack 32 is drivably connected to the screwjack drive motor which is fastened to fixed aircraft structures. Outer screwjack 34 is rotatably attached to the translating support 28 by means of pillow blocks 49. When the screwjack drive motor 48 is operated, the inner screwjack 32 rotates relative to the fixed nut 36 causing screwjack 34 to rotate within pillow blocks 49 translating the support 28 which carries the screwjack 34 therewith. It should also be understood that while one drive motor 48 is shown, it is within the scope of the inventor to provide additional drive motors according to the size of the thrust reverser application of the present invention.

Carried on the threads 50 of the screwjack 34 is a nut carriage 52. It should be understood that when screwjack 34 rotates, nut carriage 52 translates along the threads 50 of the screwjack. Pivotly attached to each side flange 54 of carriage 52 through pivot pins 55 or the like is a drive link member 56. The opposite ends of the link members 56 are pivotly attached to a reverser or blocker door 22 through pivot connections 58.

The pitch of the threads 38 screwjack 32 are different than the pitch of the threads 50 on screwjack 34. This feature allows the action of translating the support 28 to be at a faster rate of speed than the rotational translation speed of the blocker doors 22 for the purpose of preventing engine back pressure when deploying or stowing the reverser or blocker doors.

OPERATION OF THE MECHANISM

To deploy the reverser or blocker doors from their stowed position of FIG. 1 to their deployed position of FIG. 2 the following sequential events occur. The screwjack drive motor 48 is activated rotating both screwjacks 32 and 34. Screwjack 32 rotates in fixed nut 36 causing the translating support 28 to translate aft while the carriage 52 also translates aft along the threads of screwjack 34. The coarse pitch of the threads 38 on screwjack 32 causes the support 28 to translate aft faster than the finer thread pitch of threads 50 of screwjack 34 cause the reverser or blocker doors 22 to rotate upward and aft about pivots 26, thus no engine back pressure occurs before, during or after the blocker doors are fully deployed.

To stow the now deployed blocker doors 22, the screwjack drive motor 48 is operated in an opposite rotational drive mode.

While the invention has been shown and described in but one form, it will be obvious to those skilled in the art that is is not so limited, but susceptible of various change and modifications without departing from the spirit thereof.

What is claimed is:

1. A thrust reverser nozzle through which a fluid stream is discharged as a jet, thrust reversal means surrounding said nozzle, a drive means comprising nested inner and outer jackscrews, said inner jackscrew is non-translatable and said outer jackscrew is translatable relative thereto, said inner jackscrew is rotated by a jackscrew drive motor and said outer jackscrew is interconnected to said inner jackscrew for rotation therewith by a slidable mechanical connection therebetween, whereby said thrust reversal means moves rearwardly as a unit at a first speed of translation while moving said thrust reversal means into a position to reverse the flow of gas as it leaves the nozzle at a second speed of translation which is slower than said first speed of translation.

2. The invention as defined in claim 1 wherein splines on the outer end surface of said inner screwjack engage keyways on the inner surface of said outer screwjack providing rotational engagement while allowing relative translation therebetween.

3. Aircraft jet engine thrust reversing mechanism comprising:
   a pair of accurate blocker doors having forward, aft and inner surfaces;
   blocker door translating and deploying mechanism comprising;
   a translating support which slidably engages track means carried by said aircraft;
   a pair of nested inner and outer screwjacks, said inner screwjack connected to and rotatively driven by a screwjack drive motor attached to said aircraft, said inner screwjack rotatably engages a means fixedly attached to said translating support whereby when said inner screwjack is rotated said translating support translates, said outer screwjack is slidably interconnected to said inner screwjack whereby said screwjacks rotate together while said outer screwjack is free to translate relative to said inner screwjack, said outer screwjack rotatably attached in a fixed location to said translating support, a carriage driven by and carried by the outer screwjack whereby said carriage is translatable when said screwjacks are rotated;

a pair of drive link members, each one of said pair of drive link members being pivotly attached at one end to opposite sides of said carriage and at their opposite ends to a separate one of said blocker doors, the aft inner corners of said blocker doors being pivotly connected to the aft end of said translating support, whereby when in their stowed position the blocker doors are deployed by operating the drive motor which cause the translating support to translate aft and the outer screwjack to rotate the blocker doors to an engine fluid stream reversing position about their translating support attachment.

4. The invention as defined in claim 3 wherein splines on the outer surface of said inner screwjack engage keyways provided on the inner surface of said outer screwjack providing rotational engagement while allowing relative translation therebetween.

5. The invention as defined in claim 3 wherein the thread pitches of the inner and outer screwjacks are different.

6. The invention as defined in claim 5 wherein the thread pitch on said inner jackscrew is greater than the thread pitch on the outer jackscrew.

7. The invention as defined in claim 3 wherein said translating support translates a distance greater than said carriage.

* * * * *